INVENTOR.
EDWARD L. WOOD
BY
ATTORNEY

June 5, 1956    E. L. WOOD    2,749,185
WHEEL TRIM CUSHIONING MEANS
Filed Sept. 13, 1954    2 Sheets-Sheet 2

INVENTOR.
EDWARD L. WOOD
BY
Everett G. Wright
ATTORNEY

United States Patent Office 2,749,185
Patented June 5, 1956

2,749,185

WHEEL TRIM CUSHIONING MEANS

Edward L. Wood, Detroit, Mich., assignor, by direct and mesne assignments, to Gar Wood Industries, Inc., a corporation of Michigan Application September 13, 1954, Serial No. 455,679

11 Claims. (Cl. 301—37)

This invention relates to wheel trim construction of the type that is spring-held onto the wheel, and in particular to spring clip means for holding the wheel trim onto the wheel and to means for cushioning and insulating the wheel trim from the rim of the wheel to which it is applied.

This invention is an improvement over the wheel trim construction and securing means disclosed in my prior Patents No. 2,394,958 issued February 12, 1946 and No. 2,455,151 issued November 30, 1948, and disclosed in my pending application for patent Serial No. 343,852 filed March 23, 1953, entitled "Wheel Trim and Fastening Means." Certain of the claims of the present application are directed to wheel trim retaining clips disclosed in said pending application, Serial No. 343,852.

The invention contemplates the securing of trim rings, wheel covers and wire wheel simulating wheel trim to vehicle wheels and cushioning the trim in respect to said vehicle wheels by employing a plurality of specially formed circumferentially spaced spring clips which are clamped on the wheel over the outer lip of the rim and have their free ends disposed radially inward toward the wheel channel or wheel spider. The wheel trim is formed with an inner annular groove therein into which the inner ends of the spring clips are engaged. The force of the spring clips urges the wheel trim into facial engagement over the outer lip of the wheel rim and maintains the wheel trim in the desired position on the wheel.

In certain installations of the wheel trim, undesirable noises such as squeaking and drumming occur when driving the vehicle as a result of the wheel trim riding over the lip of the rim on the circumferentially spaced spring clips employed to secure the wheel trim to the wheel.

One of the objects of this invention is to provide wheel trim cushioning means between the wheel trim and the wheel which will eliminate squeaking, drumming and other undesirable noises that may occur during the operation of a motor vehicle having wheel trim installations of the type hereinbefore described.

Another object of the invention is to provide wheel trim cushioning means between the wheel trim and the wheel which holds the wheel trim in the desired spaced relationship to the lip of the rim of the wheel onto which the wheel trim is secured whereby to permit water, sand and the like that otherwise may collect in the circumferential pocket formed between the wheel trim and the wheel rim to drain or be thrown centrifugally therefrom.

Other objects of the invention will become apparent by reference to the following detailed description taken in connection with the accompanying drawings, in which.

Figures 1, 2, 3, 4, 5, 6, 7:
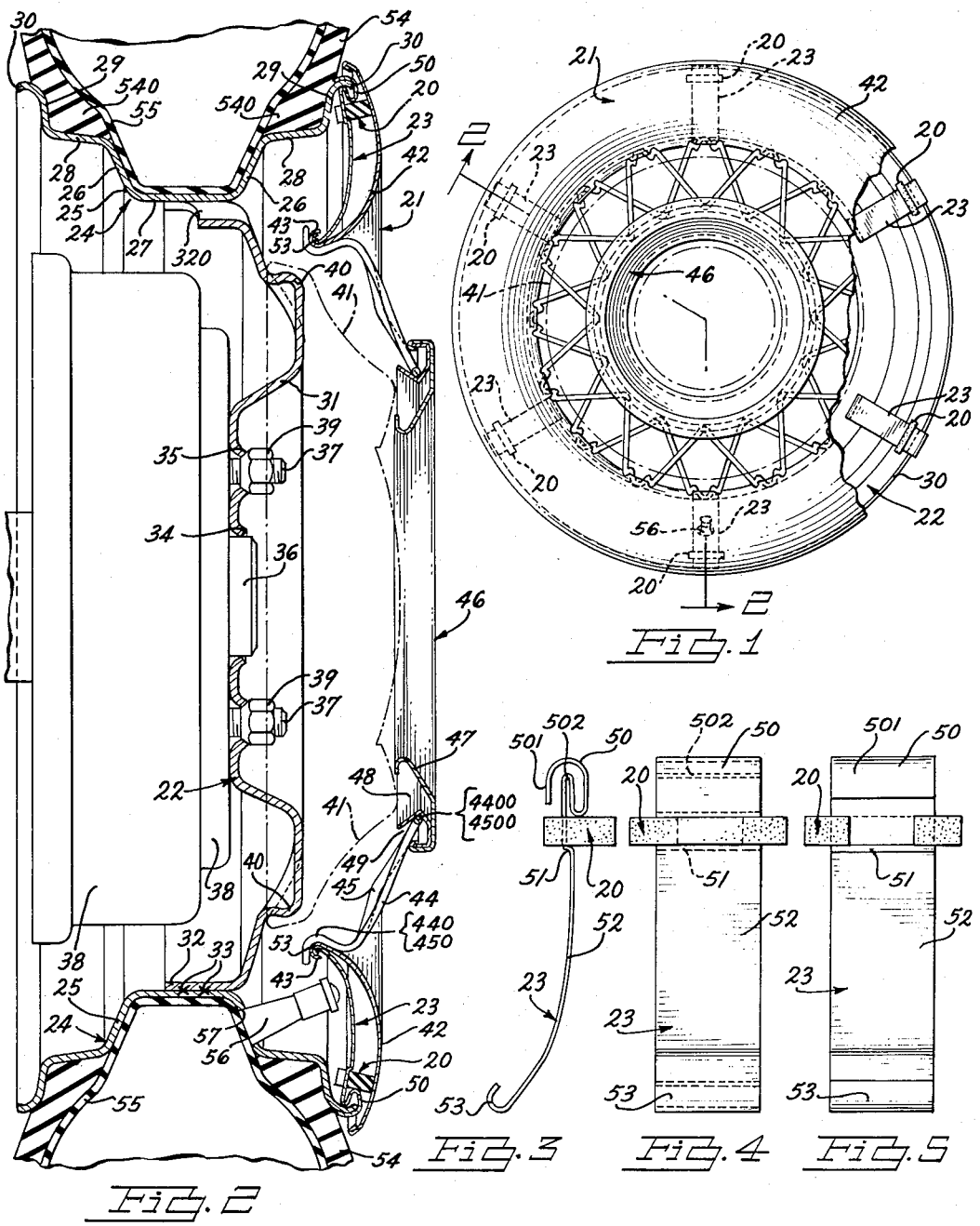
Fig. 1 is an elevational view of a wheel having wheel trim spring-secured thereon employing wheel trim cushioning means embodying the invention.
Fig. 2 is an enlarged sectional view taken on the line 2—2 of Fig. 1.
Figs. 3, 4 and 5 are side, front and rear elevational views respectively of one of the spring clips employed to secure the wheel trim in spring loaded relationship onto the wheel, the said spring clip being equipped with cushioning means embodying the invention.
Fig. 6 is an enlarged elevational view of the cushion block employed on each spring clip to cushion and space the wheel trim in respect to the wheel rim.
Fig. 7 is a sectional view taken on the line 7—7 of Fig. 6.

Referring now to the drawings wherein like numerals refer to like and corresponding parts throughout the several views, the wheel trim cushioning means 20 disclosed for illustrative purposes is shown in connection with the securing of a wire wheel simulating wheel trim 21 to a vehicle wheel 22 by means of a plurality of spring clips 23. Obviously, the wheel trim cushioning means 20 can be employed in connection with the spring-securing of other types of wheel trim to a vehicle wheel, as for example, wheel covers, wheel rings, and the like.

The vehicle wheel 22 has a drop center rim 24 composed of a central channel 25 having side walls 26 and a base 27, a tire bead seat 28 extending laterally outward from each of the channel side walls 26, and a curved flange 29 extending upwardly and outwardly from each tire bead seat 28 terminating in an outer lip 30. Disposed within the center of the drop center rim 24 is a spider 31 having a flange 32 which is generally secured to the central channel 25 of the said drop center rim 24 by such means as welding at 33. The spider 31 is provided with a hub aperture 34 and securing stud holes 35 to accommodate respectively the wheel hub 36 and the studs 37 extending from the brake drum 38 to which the wheel 22 is secured by means of the usual wheel securing nuts 39. The flange 32 of the spider 31 is generally scalloped out at 320 at intervals around the periphery thereof to provide added structural strength to the wheel 22. The spider 31 is preferably provided with a plurality of hub cap retainer nubs 40 over which a hub cap indicated by the dot and dash lines 41 is sprung, the said nubs 40 retaining the hub cap 41 onto the wheel 22.

Vehicle wheels of the type just described flex and weave slightly under running and shock loads as, for example, when the vehicle is turning a corner or when riding over a rough road. It is this flexing and weaving coupled with slight relative movement of the wheel trim in respect to the wheel that causes some wheel trim noises when the wheel trim 21 is secured by being spring-clipped onto the wheel 22.

The particular wheel trim 21 shown for illustrative purposes is a wire wheel simulating wheel trim composed of a trim ring 42 having an inner annular groove 43 therein forming an inner rolled annular edge or bead 430 over which is sprung the outer hooked apexes 440 and 450 of staggered multi-pointed wire star shaped elements 44 and 45 employed to simulate the spokes of a wire wheel. Over the inner apexes of the star shaped wire spoke simulating elements 44 and 45 is sprung a central ornamental collar 46 formed of two pieces; namely, an outer ornamental ring 47 and an inner spoke engaging ring 48 having an annular groove 49 therein to accommodate the inner apexes of the said staggered star shaped wire spoke simulating elements 44 and 45. Obviously, any type of wheel trim may be substituted for the wire wheel simulating wheel trim 21 provided it includes an annular groove similar to the groove 43 therein to receive the spring clips 23 as hereinafter described.

The spring clips 23 employed to secure the wheel trim 21 to the wheel 22 are preferably formed of strip spring steel to provide a reversedly bent and looped head 50, a transverse offset 51 spaced from the head 50, and a curved arm 52 having a wheel trim engaging hook 53 at the outer end thereof. The spring clips 23, preferably five or six of them, are sprung tightly over the lip 30 of the wheel rim 24 onto the curved flange 29 thereof with the transverse edge of the free leg 501 of the looped head 50 thereof disposed in abutment with the bead 540 of the tire 54 which is mounted on the drop center rim 24 in the usual manner. The particular tire illustrated has an inner tube 55 with a valve stem 56 extending therefrom through the valve stem aperture 57 provided in one side wall 26 of the central rim channel 25. It will be noted that when the the spring clips 23 are properly positioned on the flange 29 of the wheel rim 24, the outer free leg 501 of the looped head 50 of the spring clips 23 and the inner reversedly bent edge 502 thereof grip opposite sides of the lip 30 of the wheel flange 29 inwardly from the edge thereof as best shown in Fig. 8.

Figure 9:
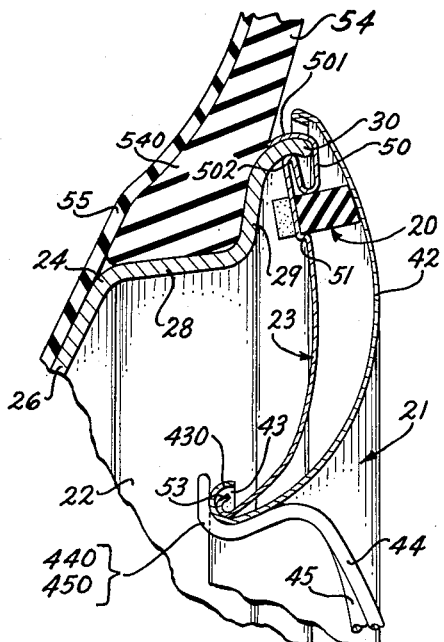
Fig. 9 is an enlarged cross sectional view through a wheel and wheel trim showing the wheel trim, wheel trim securing clips and cushioning means disposed in the attitude assumed thereby when the wheel trim is in its normal position on the wheel.
Figure 11:
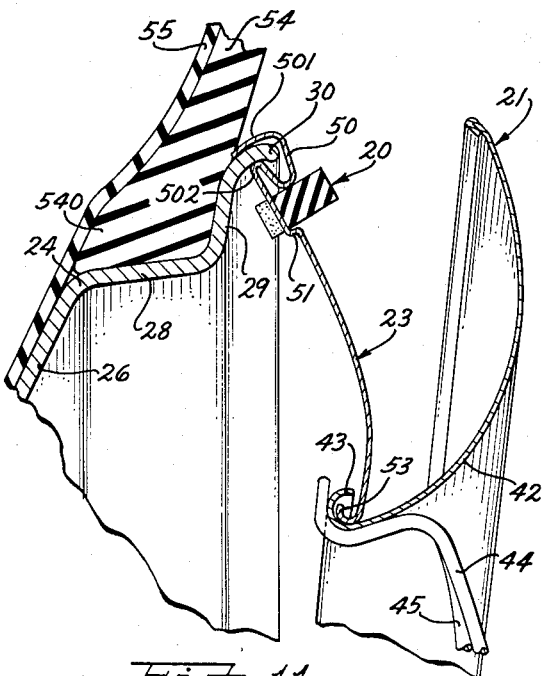
Fig. 11 is a cross sectional view similar to Fig. 10 showing the wheel trim, wheel trim securing clips and cushioning means disposed in the attitude assumed thereby when the wheel trim is fully sprung in extended relationship from the wheel with the spring clips sprung over-center to maintain the wheel trim in such extended position.
Figure 10:
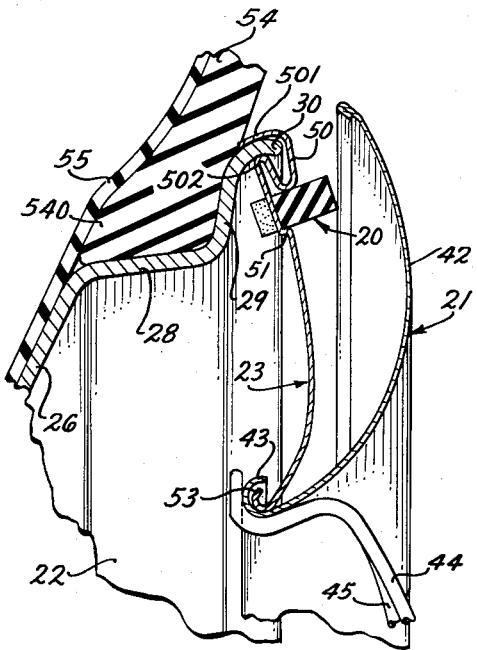
Fig. 10 is a cross sectional view similar to Fig. 9 showing the wheel trim, wheel trim securing clips and cushioning means disposed in the attitude assumed thereby when the wheel trim is partially sprung from the wheel.

By reference to Figs. 9, 10 and 11, it will be noted that the looped head 50 of the spring clips 23 distorts as the extreme end edge of the free leg 501 and the reversedly bent edge 502 thereof grip the lip 30 of the wheel flange 29 inwardly of the outer edge thereof, the end edge of the free leg 501 remaining against the top of the lip of the rim while the reversedly bent edge 502 pivots against the bottom of the lip of the rim. This pivotal action in an outward direction from the position shown in Figure 9 to the position shown in Figure 11 forcibly spreads the tip of leg 501 from the nose 502 and thus the tip tends to resist such action and restore the parts to their Figure 9 position.

Figure 8:
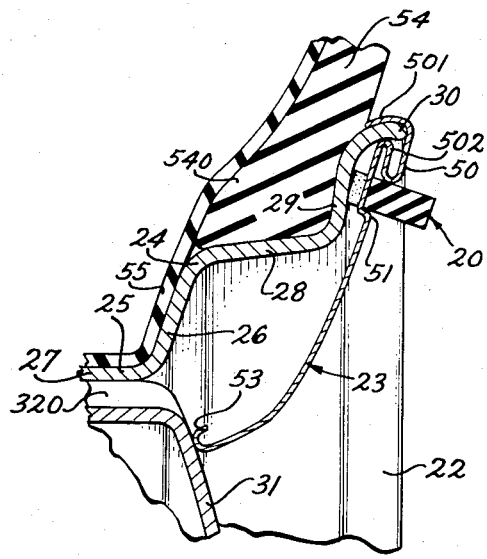
Fig. 8 is an enlarged fragmentary sectional view through a wheel and a wheel trim securing clip including trim cushioning means embodying the invention, the wheel trim securing clip taking the attitude assumed by it prior to its being sprung into engagement with the wheel trim.

In the unloaded position of the spring clip 23 as shown in Fig. 8, the arm 52 thereof is disposed inwardly toward the center of the wheel 22 or the wheel spider 31. If the trim ring 42 were narrower, the arm 52 of the spring clip 23 would dispose itself inwardly toward the side wall 26 of the drop center rim channel 25.

Each of the spring clips 23 has mounted thereon a more or less rectangular resilient wheel trim cushioning block 20 formed with a transverse slot 58 therein and is notched out at 59 to permit it to be readily assembled onto the arm 52 of the spring clip 23 between the looped head 50 and the transverse offset 51 thereof. If the cushioning block 20 fits snugly onto the arm 52 of the spring clip 23, the said arm 52 need not be offset at 21. However, the employment of the offset 51 assures the maintenance of the cushioning block 20 in its proper position at all times.

When the wheel trim engaging hook 53 of each spring clip 23 is engaged into the annular groove 43 of the wheel trim ring 42, the spring clips 23 bias the wheel trim 21 toward and hold it tightly against the cushioning blocks 20 carried by the spring clips 23, see Fig. 9. In this position, the entire wheel trim 21 is firmly held onto the rim 24 of the wheel 22 but spaced slightly therefrom by the cushioning means 20. Any squeaking or drumming or other unwanted noises from the wheel trim 21 is substantially eliminated by the employment of the cushioning means 20 carried by the spring clips 23 which secure the wheel trim 21 to the wheel 22.

Fig. 10 shows the attitude taken by the wheel trim 21, spring clips 23 and cushioning means 20 when the wheel trim 21 is pulled slightly outwardly from the outer lip 30 of the wheel rim 24. The length of the arm 52 of the spring clips 23 is so proportioned in respect to the diameter of the lip 30 of the wheel rim 24 and the diameter of the annular groove 43 in the trim ring 42 of the wheel trim 21 that the pulling of the wheel trim 21 further out as indicated in Fig. 11 will cause an over-center or toggle action of the spring clips 23 and hold the wheel trim 21 outwardly from the wheel rim 24. In this position, the tire valve stem 56 is readily accessible for inflation of the inner tube 55 of the tire 54. Pushing the wheel trim 21 inwardly from its position shown in Fig. 11 will cause it to snap forcibly into the position thereof shown in Fig. 9, and the spring clips 23 will maintain the wheel trim 21 in such position against the cushioning means 20 carried by the spring clips 23 even when a vehicle equipped therewith is driven over extremely rough and bumpy roads. It will be observed that the wheel trim 21 does not directly contact any portion of the vehicle wheel 22 or hub cap 41, and that the spring clips 23 hold the wheel trim firmly in place against the cushioning means 20.

The employment of the cushioning means 20 on the spring securing clips 23 assures a rattle and noise free spring-securement of the wheel trim 21 to the wheel 22, and at the same time, the wheel trim 21 is held sufficiently free from the lip 30 of the rim 24 of the vehicle wheel 22 to prevent an accumulation of water, dirt, sand or the like in the circumferential pocket formed by the wheel trim 21 and the wheel rim 24.

The hooked end 53 of each clip normally serves only to provide an increased bearing surface between the inner end of the clip and the groove 43. However, if an attempt is made to force the wheel trim outwardly from the position shown in Fig. 11, the hooks will engage the rim of the flange and prevent separation of the trim from the clips.

Although but a single embodiment of the invention has been disclosed and described herein, it is obvious that many changes may be made in the size, shape, arrangement and detail of the various elements of the invention without departing from the spirit and scope thereof as defined in the appended claims.

I claim:

1. A spring clip employable in securing wheel trim to a vehicle wheel, said clip being formed from strip spring steel reversedly bent and looped at one end to form a head having an inner reversedly bent nose portion and outer free leg for engaging the top and bottom of the lip of the rim of the vehicle wheel respectively when sprung thereon, said clip having a hook at the other end thereof for engagement with the wheel trim inwardly from the periphery thereof, said spring clip adapted to bias said wheel trim toward said wheel, and nonmetallic resilient means mounted on said spring clip for holding said wheel trim out of engagement with the wheel and said clip.

2. In combination, a spring clip for mounting wheel trim on a vehicle wheel having an outstanding lip on the rim thereof, said spring clip including a head for engaging said rim and an arm which will extend from said head inwardly toward the hub of the wheel, the inner end of said arm being adapted to engage said wheel trim, a resilient block slidably mounted on said spring clip for spacing said wheel trim from said wheel and said spring clip, and means maintaining said resilient block in the desired longitudinal position on said spring clip.

3. In combination, a spring clip for mounting wheel trim on a vehicle having an outstanding lip on the rim thereof, said spring clip including a head for engaging said rim and an arm which will extend from said head inwardly toward the hub of the wheel, the inner end of said arm being adapted to engage said wheel trim, and a resilient block mounted on said spring clip for spacing said wheel trim from said wheel and said spring clip, and a transverse projection on the arm of said spring clip adjacent the head thereof but spaced therefrom maintaining said resilient block in the desired longitudinal position on said spring clip.

4. A spring clip for securing wheel trim to a vehicle wheel having a rim with an outstanding lip, said spring clip comprising an arm having a looped head thereon including an outer free leg and an inner reversedly bent nose portion for engaging the top and bottom respectively of the lip of the wheel rim, said arm being formed to project inwardly from the lip of the rim toward the center of the wheel, and a hook at the bottom of said arm for engaging in a channel formed in said wheel trim radially inward of the periphery thereof.

5. A spring clip for securing wheel trim to a vehicle wheel having a rim with an outstanding lip, said spring clip comprising an arm having a looped head thereon including an outer free leg and an inner reversedly bent nose portion for engaging the top and bottom of the lip of the wheel rim, respectively, said arm being normally bent and formed to project from the lip of the rim toward the center of the wheel for engaging said wheel trim radially inward of the periphery thereof, the looped head of said clip being flexible, and the extremity of the free leg of said clip head projecting axially inwardly beyond the nose portion thereof to grip said wheel rim and resist movement of the arm of the spring clip axially outwardly from its normal position.

6. In combination, a spring clip for securing wheel trim to a vehicle wheel having a rim with an outstanding lip, said spring clip comprising an arm having a looped head thereon including an outer free leg and an inner reversedly bent nose portion for engaging the top and bottom of the lip of the wheel rim, respectively, said arm being formed to project from the lip of the rim toward the center of the wheel for engaging said wheel trim radially inward of the periphery thereof, the looped head of said clip being flexible to cause the edge of the free leg of said clip head and the nose portion thereof to grip said wheel rim and resist movement of the arm of the spring clip outwardly from its normal position, and a resilient block disposed on said clip arm for maintaining said wheel trim in spaced relationship with respect to said wheel and said clip.

7. In combination, a spring clip for securing wheel trim to a vehicle wheel having a rim with an outstanding lip, said spring clip comprising an arm having a looped head thereon including an outer free leg and an inner reversedly bent nose portion engaging the top and bottom of the lip of the wheel rim, respectively, said arm being bent and formed to project from the lip of the rim toward the center of the wheel, and a hook at the bottom of said arm for engaging said wheel trim radially inward of the periphery thereof, the looped head of said clip being flexible to cause the edge of the free leg of said clip head and the nose portion thereof to grip said wheel rim and resist movement of the arm of the spring clip outwardly from its normal position, and a resilient block slidably disposed on said clip arm for maintaining said wheel trim in spaced relationship with respect to said wheel and said clip, said clip arm having a projection thereon spaced from the head of said clip maintaining said resilient block adjacent said clip head.

8. In combination, a vehicle wheel member, a wheel trim member adapted for mounting on the side of said wheel member, and a plurality of generally radially extending toggle spring elements positioned between the trim member and the wheel member, and holding the trim member on the wheel member, each spring element being connected at one end to one of the members and at its opposite end bearing on the other member with the wheel member end positioned axially outwardly of the other end and the element being bowed in endwise compression when the trim member is in normal assembled position against the side of the wheel, and resilient bumper means positioned between said member and at least certain of said elements for limiting movement of the member toward the wheel and holding the trim member and wheel out of direct contact with each other.

9. In combination, a vehicle wheel, a wheel trim member adapted for mounting on the side of said wheel, and a plurality of generally radially extending toggle spring elements positioned between the trim member and the wheel and holding the member on the wheel, each spring element being connected at one end to the wheel and at its opposite end to the trim member with the first mentioned end positioned axially outwardly of the other end and the element being bowed in endwise compression when the trim member is in normal assembled position against the side of the wheel, and resilient non-metallic bumper elements mounted on at least certain of said elements and engaging said trim member and holding the trim member out of direct contact with the wheel.

10. A spring clip for securing wheel trim to a vehicle wheel having a rim with an outstanding lip, said spring clip comprising an arm having a looped head thereon including an outer free leg and an inner reversedly bent nose portion for engaging the top and bottom of the lip of the wheel rim, respectively, said arm being normally bent and formed to project from the lip of the rim toward the center of the wheel, hooks on inner ends of arms for engaging said wheel trim radially inward of the periphery thereof, the looped head of said clip being flexible, and the extremity of the free leg of said clip head projecting axially inwardly beyond the nose portion thereof to grip said wheel rim and resist movement of the arm of the spring clip axially outwardly from its normal position.

11. In combination, a spring clip for securing wheel trim to a vehicle wheel having a rim with an outstanding lip, said spring clip comprising an arm having a looped head thereon including an outer free leg and an inner reversedly bent nose portion for engaging the top and bottom of the lip of the wheel rim, respectively, said arm being formed to project from the lip of the rim toward the center of the wheel, hooks on inner ends of arms for engaging said wheel trim radially inward of the periphery thereof, the looped head of said clip being flexible to cause the edge of the free leg of said clip head and the nose portion thereof to grip said wheel rim and resist movement of the arm of the spring clip outwardly from its normal position, and a resilient block disposed on said clip arm for maintaining said wheel trim in spaced relationship with respect to said wheel and said clip.

References Cited in the file of this patent

UNITED STATES PATENTS

| | | |
|---|---|---|
| 2,016,395 | Sinclair | Oct. 8, 1935 |
| 2,076,789 | Le Jeune | Apr. 13, 1937 |
| 2,304,583 | Lyon | Dec. 8, 1942 |
| 2,394,958 | Wood | Feb. 12, 1946 |
| 2,678,210 | Reuter | May 11, 1954 |